US007610649B2

(12) United States Patent

Ohe et al.

(10) Patent No.: US 7,610,649 B2

(45) Date of Patent: Nov. 3, 2009

(54) WIPER DEVICE

(75) Inventors: Tomohiro Ohe, Shioya-gun (JP); Mamoru Kagawa, Kawachi-gun (JP); Sadaki Takada, Kiryu (JP)

(73) Assignees: Honda Motor Co., Ltd., Tokyo (JP); Mitsuba Corporation, Gunma-ken (JP)

( * ) Notice: Subject to any disclaimer, the term of this patent is extended or adjusted under 35 U.S.C. 154(b) by 681 days.

(21) Appl. No.: 11/237,070

(22) Filed: Sep. 28, 2005

(65) Prior Publication Data

US 2006/0070201 A1 Apr. 6, 2006

(30) Foreign Application Priority Data

Oct. 1, 2004 (JP) ............................ 2004-290212

(51) Int. Cl.
*B60S 1/24* (2006.01)
*F16B 11/00* (2006.01)

(52) U.S. Cl. .................. 15/250.31; 15/250.3; 403/282; 403/359.1; 403/359.2; 403/298

(58) Field of Classification Search ............. 15/250.31, 15/250.3, 250.34, 250.352, 250.351, 250.21; 403/298, 359.1, 359.2, 282
See application file for complete search history.

(56) References Cited

U.S. PATENT DOCUMENTS

| | | | | | |
|---|---|---|---|---|---|
| 2,156,067 | A | * | 4/1939 | Rubinstein | 403/282 |
| 3,039,798 | A | * | 6/1962 | Carlson et al. | 403/11 |
| 3,800,356 | A | * | 4/1974 | Ito | 15/250.34 |
| 4,118,134 | A | * | 10/1978 | Mansel | 403/282 |
| 4,502,178 | A | * | 3/1985 | Ragot et al. | 15/250.34 |
| 5,647,680 | A | * | 7/1997 | Bienert et al. | 403/263 |
| 5,699,582 | A | * | 12/1997 | Berge et al. | 15/250.34 |
| 5,735,171 | A | * | 4/1998 | Moote et al. | 74/42 |
| 5,774,928 | A | * | 7/1998 | Schitter et al. | 15/250.34 |
| 6,283,463 | B1 | | 9/2001 | Park | |
| 6,554,477 | B1 | * | 4/2003 | Zimmer | 384/130 |
| 6,564,420 | B1 | * | 5/2003 | Merkel et al. | 15/250.34 |
| 6,802,102 | B1 | * | 10/2004 | Merkel et al. | 15/250.34 |
| 2004/0160133 | A1 | | 8/2004 | Jinno et al. | |

FOREIGN PATENT DOCUMENTS

| | | | |
|---|---|---|---|
| CN | 2601902 | Y | 2/2004 |
| JP | 4-113263 | | 10/1992 |
| JP | 3011446 | | 3/1995 |
| JP | 09-158952 | | 6/1997 |
| JP | 2000-190876 | A | 7/2000 |
| JP | 2004-142499 | | 5/2004 |
| JP | 2004-161200 | | 6/2004 |
| JP | 2004-243026 | | 9/2004 |

* cited by examiner

*Primary Examiner*—Gary K Graham
(74) *Attorney, Agent, or Firm*—Carrier, Blackman & Associates, P.C.; Joseph P. Carrier; William D. Blackman

(57) ABSTRACT

A wiper device includes a link member to which a driving force from a wiper motor is transmitted; a pivot shaft which has serrated portions formed at both ends thereof being secured to the link member at one end thereof; a lever portion which is secured to the other end of the pivot shaft; a wiper arm which is connected to an end of the lever portion divided from an axis of the pivot shaft; a link securing hole portion which is formed in the link member to which the one serrated portion being secured; and a lever securing hole portion which is formed in the lever portion to which the other serrated portion being secured.

4 Claims, 8 Drawing Sheets

WIPER DEVICE

BACKGROUND OF THE INVENTION

1. Field of the Invention

This invention relates to a wiper device which may increase a wipe area.

Priority is claimed on Japanese Patent Application No. 2004-290212, filed Oct. 1, 2004, the content of which is incorporated herein by reference.

2. Description of Related Art

There is a conventional technique for enlarging the wipe area of a wiper blade by securing one end of a lever portion to a pivot shaft and securing a wiper arm to another end of the lever portion. In this type of construction, the positional relationship of the attachment between the lever portion and the wiper arm, i.e., the attachment angle of the wiper arm to the lever portion, is optimally set so as to enlarge the wipe range (refer to Japanese Unexamined Patent Application, First Publication No. 2004-161200).

However, the abovementioned prior art has a problem that it is difficult to connect the lever portion and the wiper arm together while maintaining the attachment angle as set. When an error arises in the attachment position of the wiper arm to the lever portion, i.e., the initial position of the wiper arm, the wipe range cannot be maintained as set. Consequently, when connecting the wiper arm to the lever portion, the positional precision of the secured parts of the lever portion, the wiper arm, and so on, must be strictly managed, making this operation difficult.

SUMMARY OF THE INVENTION

Accordingly, it is an object of this invention to provide a wiper device in which a wiper arm may be attached reliably and precisely by a simple operation.

In order to achieve the above objects, the wiper device of this invention including: a link member to which a driving force from a wiper motor is transmitted; a pivot shaft which has serrated portions formed at both ends thereof being secured to the link member at one end thereof; a lever portion which is secured to the other end of the pivot shaft; a wiper arm which is connected to an end of the lever portion divided from an axis of the pivot shaft; a link securing hole portion which is formed in the link member to which one of the serrated portions being secured; and a lever securing hole portion which is formed in the lever portion to which the other serrated portion being secured.

According to this wiper device, the attachment angles around the pivot shaft of the link member and the lever portion, which are secured to the serrated portions at both ends of the pivot shaft, may be set without deviation.

Therefore, according to this wiper device, the lever portion, i.e., the wiper arm, may be easily secured at the correct attachment angle and reliably fitted non-rotatable.

Preferably, a serration bearing shape which matches the shape of the serrated portions is formed in either the link securing hole portion or the lever securing hole portion.

As a result, while engaging the serrated portion formed at one end of the pivot shaft with the serration bearing shape provided to one of the link securing hole portion or the lever securing hole portion and inserting the serrated portion formed at the other end of the pivot shaft into the other of the link securing hole portion and the lever securing hole portion, the link member and the lever portion may then be positioned around the pivot shaft and secured.

Therefore, attachment error with respect to the pivot shaft is absorbed on the side where the serration bearing shape is not formed, and the wiper arm may be secured in position as set.

The serration bearing shape should preferably be formed in the link securing hole portion.

This enables the attachment error around the pivot shaft to be absorbed by the lever securing hole portion.

Since the attachment angle of the lever portion may be easily adjusted, and attachment which has accumulated as far as the pivot shaft may be eliminated by the lever portion which is a member near the wiper arm, the attachment precision of the lever portion (i.e., the wiper arm) may be increased.

Preferably, the numbers of teeth of the serrated portions is different at both ends of the pivot shaft and the serrated portion having the higher number of teeth being secured to the side where the serration bearing shape is not formed.

This makes it possible to reduce the minimum unit of adjustment angle of the serrated portion on the side where the securing angle is adjusted.

Therefore, the adjustment may be performed even more precisely.

DETAILED DESCRIPTION OF THE INVENTION

An embodiment of the present invention will be explained with reference to the drawings.

Figure 1:
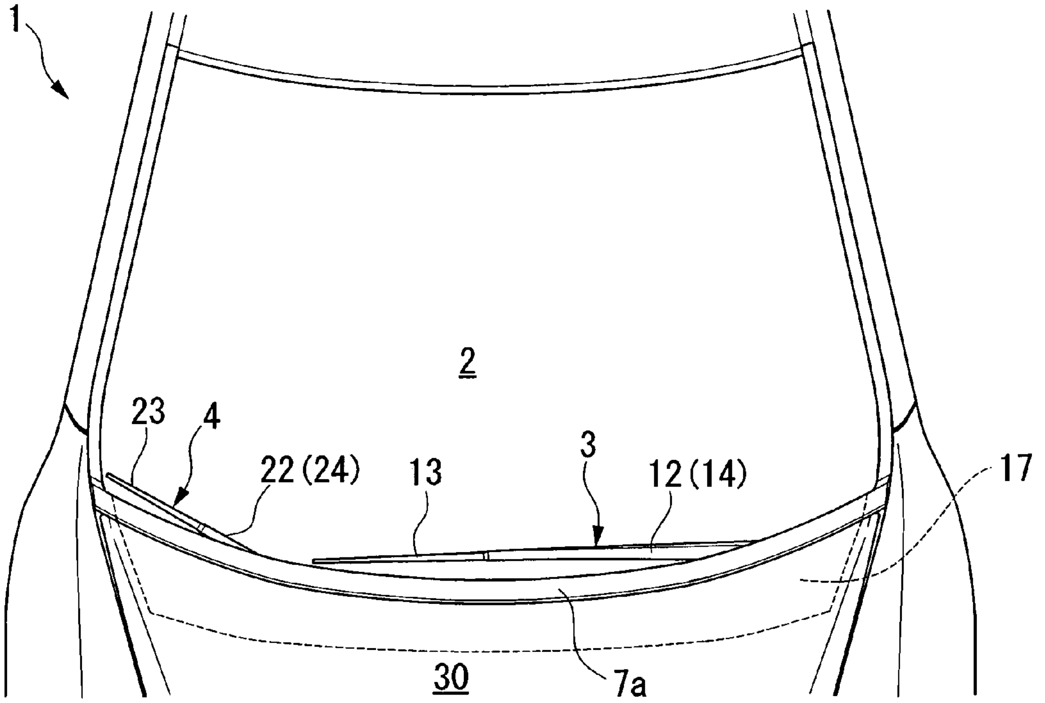
FIG. 1 is a perspective view showing the front of a vehicle to which the wiper device according to an embodiment of the present invention to be attached.
Figure 2:
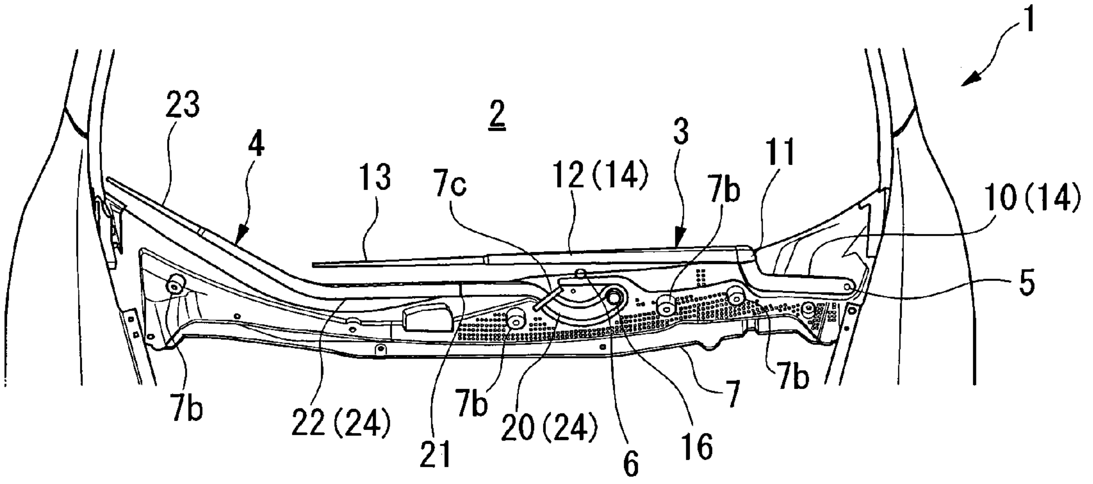
FIG. 2 is a perspective view showing the vehicle in FIG. 1 when a bonnet and a cowl top upper garnish are omitted.

As shown in FIG. 1 and FIG. 2, wiper devices 3 and 4 for wiping a front window glass 2 are provided at a vehicle 1. The wiper devices 3 and 4 execute this wiping operation by pivot shafts 5 and 6 which are rotated by a wiper motor 46, described below.

In the first wiper device 3 on the left side of the vehicle body, the pivot shaft 5 is provided on the left end side and protrudes from a cowl top garnish 7 attached in the vehicle width direction below the front window glass 2. An arm base 10 is attached to the pivot shaft 5. An elastically erectable shank 12 is supported by the arm base 10 via a hinge portion 11. A wiper blade 13 is supported by the tip of the shank 12 such that it may swing freely. The arm base 10 and the shank 12 form a wiper arm 14 of the first wiper device 3.

Figure 3:
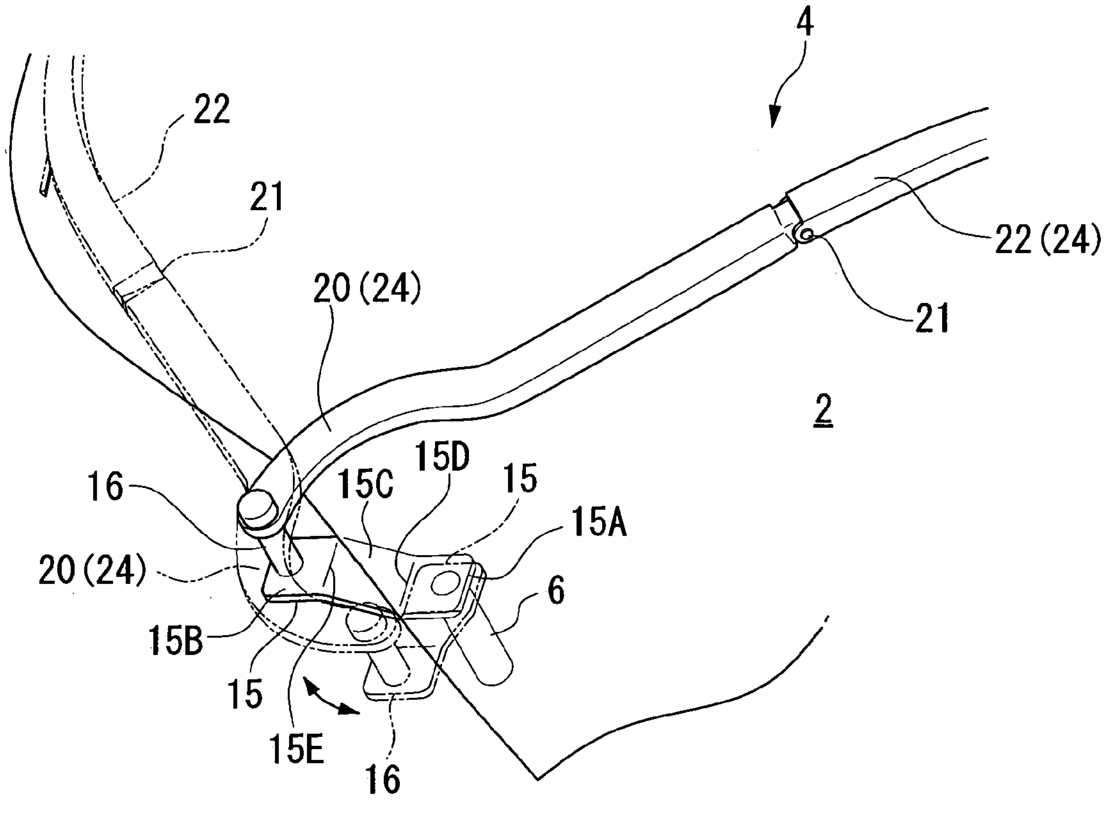
FIG. 3 is a perspective view showing an operating state of a second wiper device.

The second wiper device 4 is provided on the side right of the vehicle body. The second wiper device 4 includes an actuation lever (lever portion) 15. As shown in FIG. 3, the actuation lever 15 is secured to the pivot shaft 6 at one end thereof and may rotate freely around the pivot shaft 6. A support shaft 16 is secured to the rotating end of the actuation lever 15 and protrudes upwards therefrom. The support shaft 16 moves in an arc together with the rotating end of the actuation lever 15 which rotates around the pivot shaft 6. The support shaft 16 is positioned slightly to the left side of the center of the vehicle body. An arc-shaped arm base 20 is secured to the support shaft 16 having a shape along the arc trajectory of the support shaft 16.

An elastically erectable shank 22 is supported by the tip of the arc-shaped arm base 20 via a hinge portion 21. A wiper blade 23 is supported by the tip of the shank 22 such that it may swing freely. The arc-shaped arm base 20 and the shank 22 form a wiper arm 24 of the second wiper device 4.

A cowl top upper garnish 7*a* is provided at a position that covers the base side of the wiper arm 14 of the first wiper device 3, and covers the base of the wiper arm 24 of the second wiper device 4 together with the actuation lever 15. The cowl top upper garnish 7*a* is attached to an attachment seat 7*b* of the cowl top garnish 7.

Figure 4:
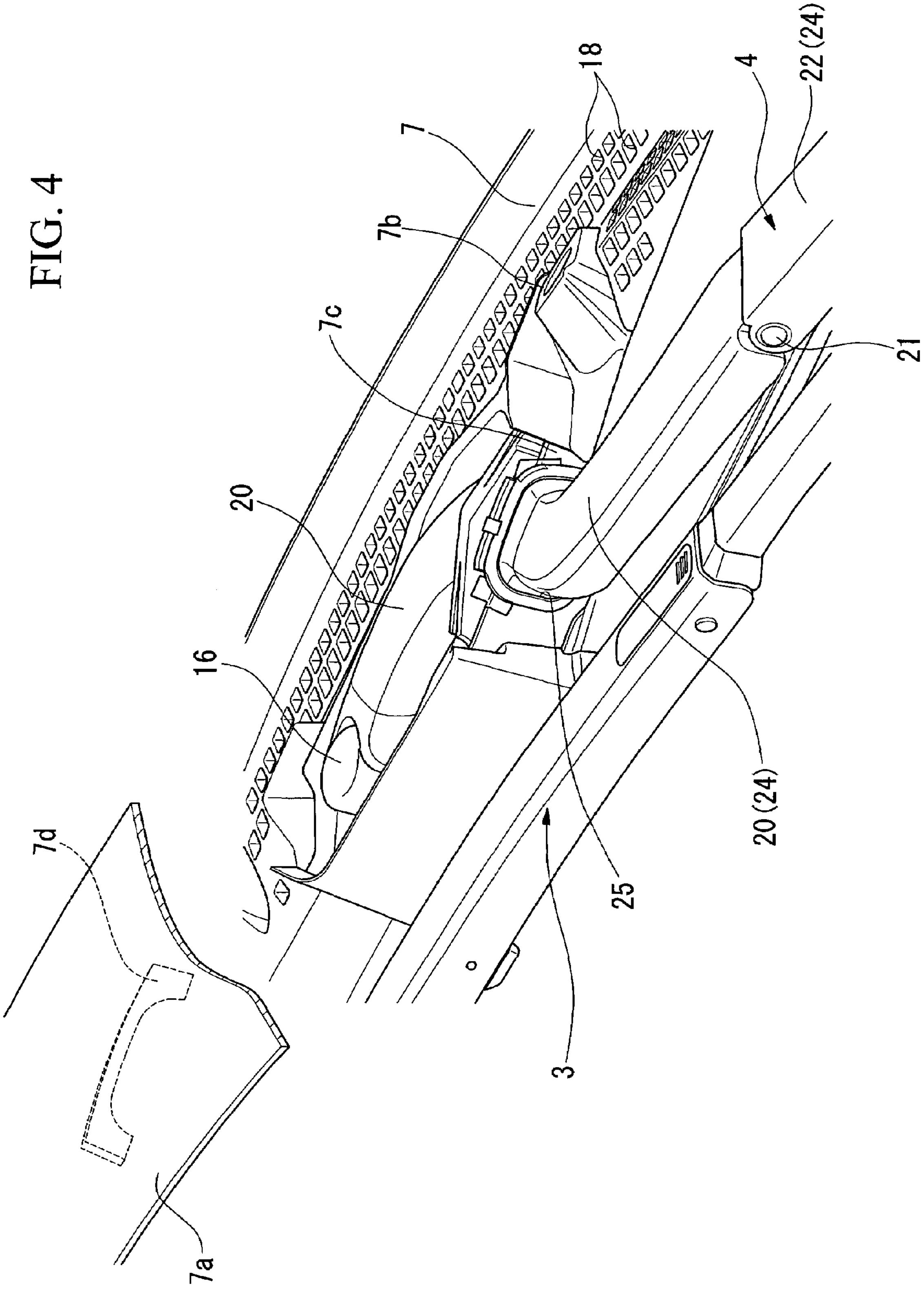
FIG. 4 is a perspective view showing principal parts of FIG. 2.
Figure 5:
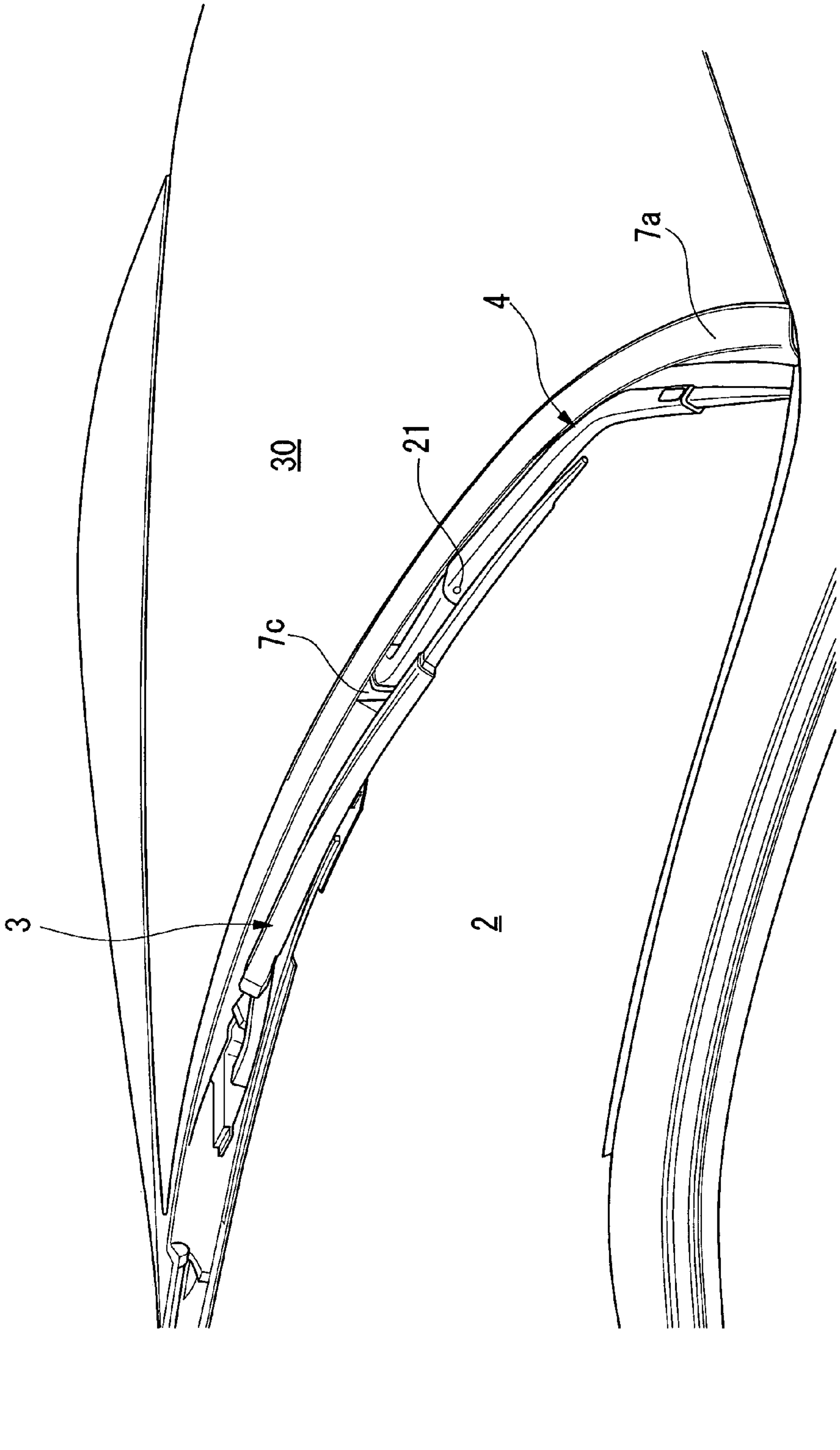
FIG. 5 is a perspective view showing around a front window glass.
Figure 6:
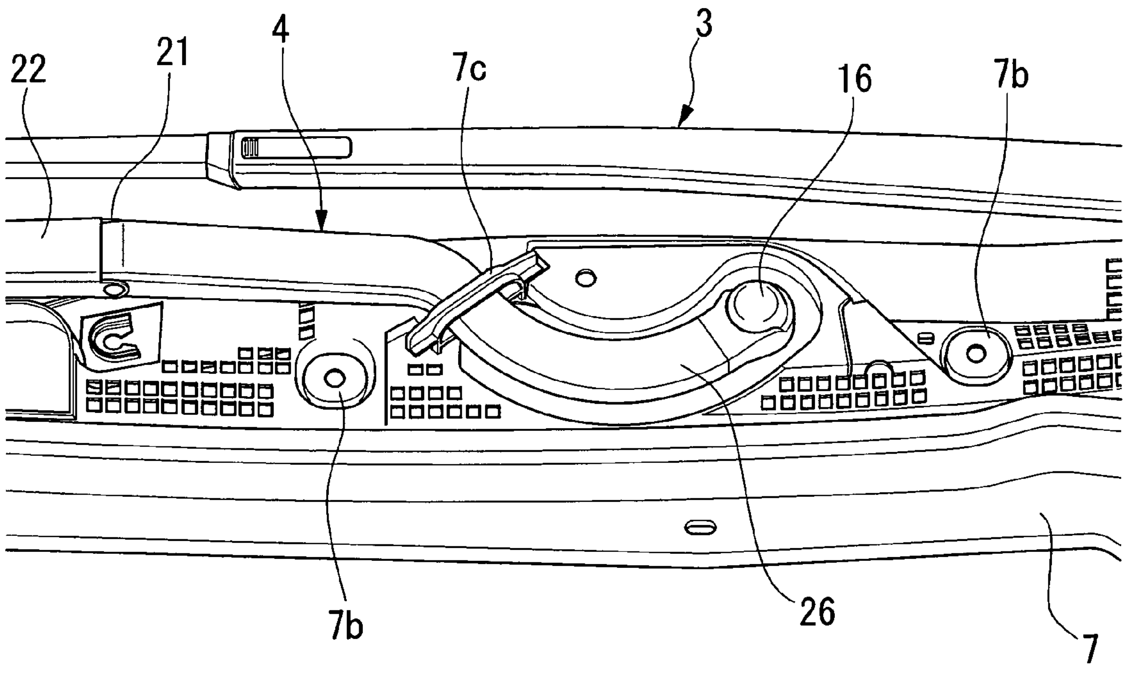
FIG. 6 is a partially enlarged view showing principal parts of FIG. 2.

As shown in FIGS. 4 to 6, the cowl top garnish 7 and the cowl top upper garnish 7*a* attached thereto form an upper wall of a cowl box portion 17 shown in FIG. 1, being a resin member arranged between the bottom of the front window glass 2 and the rear end of a bonnet 30 in the vehicle width direction. A plurality of holes 18 are provided in the top face of the cowl top garnish 7 and lead rainwater inside them. The rainwater is guided through the plurality of holes 18 to both ends of the cowl box portion 17, and discharged.

Air which is introduced from the plurality of holes 18 is led to an air introduction hole in the cowl box portion 17. The cowl top upper garnish 7*a* fitted to the top of the cowl top garnish 7 covers the plurality of holes 18 and the base sides of the first and second wiper devices 3 and 4.

A detachable vertical wall member 7*c* is sandwiched between the cowl top garnish 7 and the cowl top upper garnish 7*a*. An actuation hole 25 is provided in the vertical wall member 7*c*, and passes through the arc-shaped arm base 20 of the second wiper device 4. As shown in FIG. 4, a pressing portion 7*d* is provided in the rear face of the cowl top upper garnish 7*a* at a position corresponding to the vertical wall member 7*c*, and presses against the vertical wall member 7*c*.

The first wiper device 3 and the second wiper device 4 include a link device 40 for synchronously operating the pivot shafts 5 and 6.

As shown in FIGS. 7 to 10, the link device 40 includes a motor bracket 41 on the left side of the vehicle body and a bracket 42 on the right side of the vehicle body. The motor bracket 41 and the bracket 42 are securely connected by a support rod 43. An attachment seat 44 is provided at the motor bracket 41, and an attachment seat 45 is provided at the bracket 42. These attachment seats 44 and 45 secure the link device 40 to the vehicle body. The pivot shaft 5 is supported by the motor bracket 41 such that it may rotate freely. The pivot shaft 6 is supported by the bracket 42 such that it may rotate freely.

Figure 9:
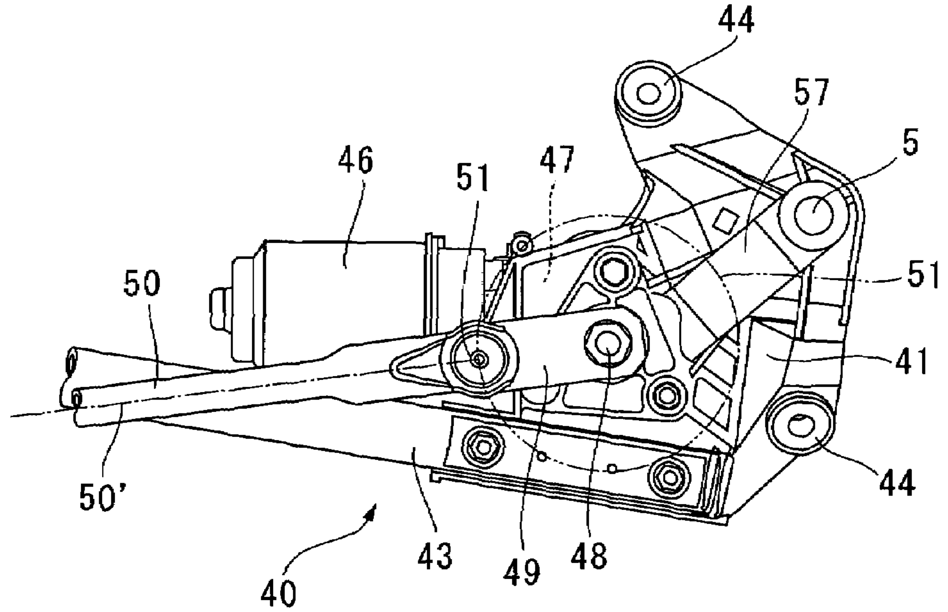
FIG. 9 is a plan view showing principal parts of a link device viewed from the bottom face side, taken along the arrow A in FIG. 7

The motor bracket 41 is provided with a wiper motor 46 and a decelerator 47 which is connected to the wiper motor 46 such that power may be transmitted. As shown in FIG. 9, the base end of a drive link 49 is secured to a rotation output shaft 48 of the decelerator 47. One end of an A rod 50 is supported by a pin 51 such that it may freely rotate at the rotation end of the drive link 49.

Figure 10:
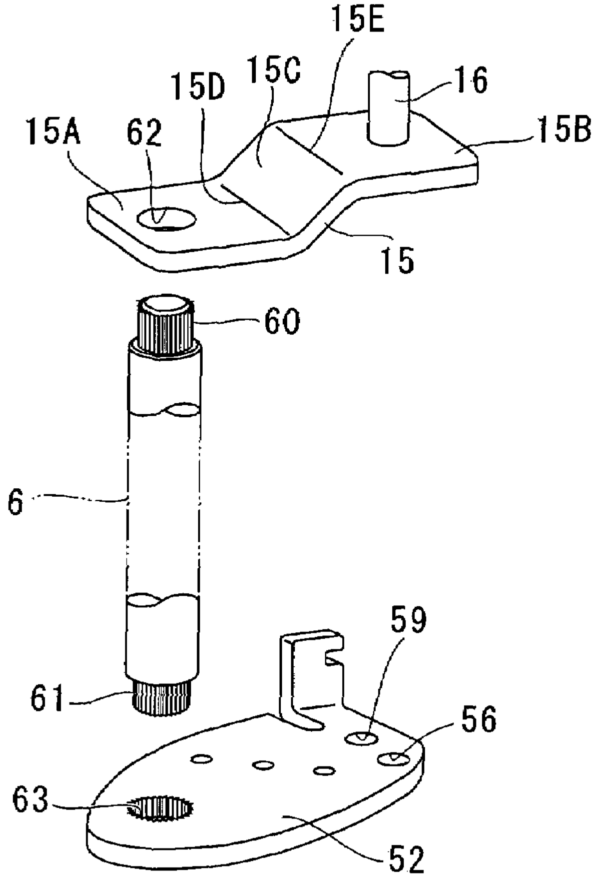
FIG. 10 is an exploded perspective view showing principal parts of a wiper device according to an embodiment of the present invention.

The base end of a B link (link member) 52 is secured to the bottom end of the pivot shaft 6 which is supported by the bracket 42. The other end of the A rod 50 is supported by a pin 53 such that it may freely rotate at the rotating end of the B link 52. In FIG. 10, reference symbol 56 represents a support hole for the pin 53.

Figure 7:
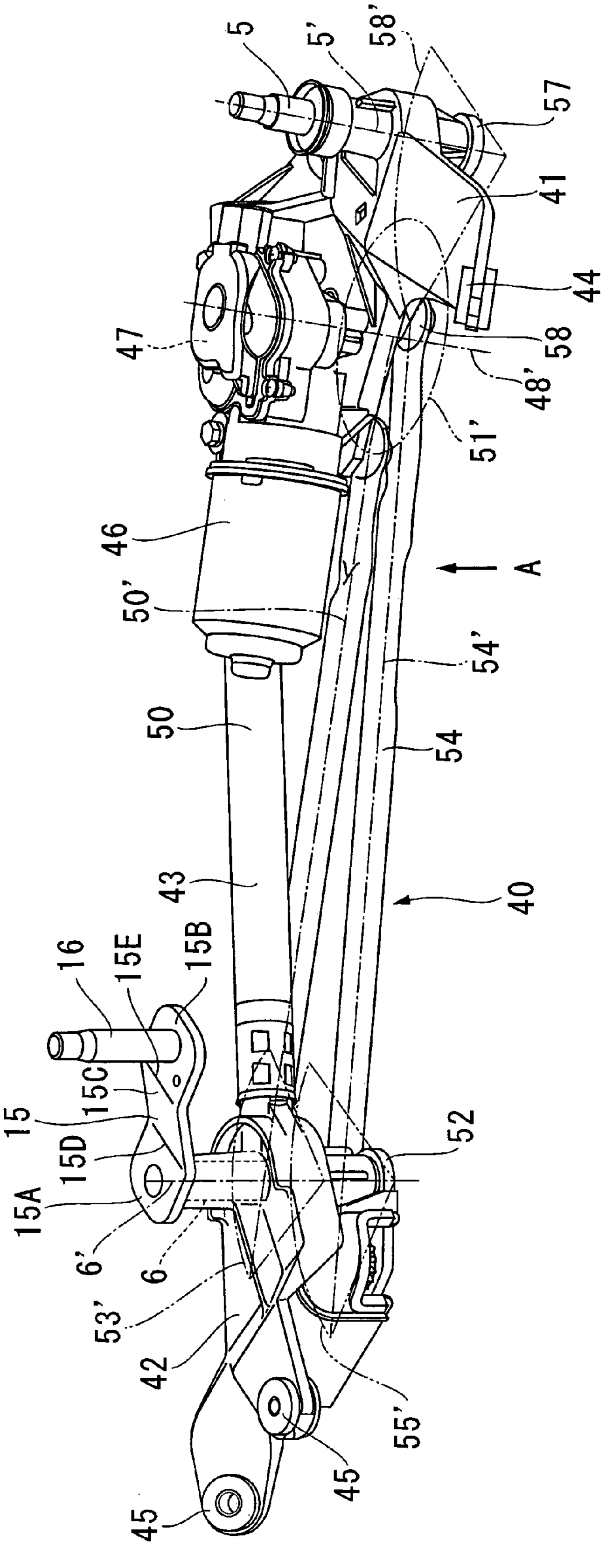
FIG. 7 is a perspective view showing a link device viewed from the front face side.

One end of a B rod 54 is supported by a pin 55 such that it may freely rotate near the rotating end of the B link 52, more specifically, near the attachment position of the pin 53 on the A rod 50. In FIG. 10, reference symbol 59 represents a support hole for the pin 55. As shown in FIG. 7, the other end of the B rod 54 is supported such that it may freely rotate by an unillustrated rotating end of a C link 57 (shown in FIG. 9) via a pin 58. The base end of the C link 57 is secured to the bottom end of the pivot shaft 5.

As shown in FIG. 10, one end of the actuation lever 15 is secured to the top end of the pivot shaft 6. The support shaft 16 is attached to the other end of the actuation lever 15. The arc-shaped arm base 20 of the wiper arm 24 is attached to the support shaft 16.

Figure 8:
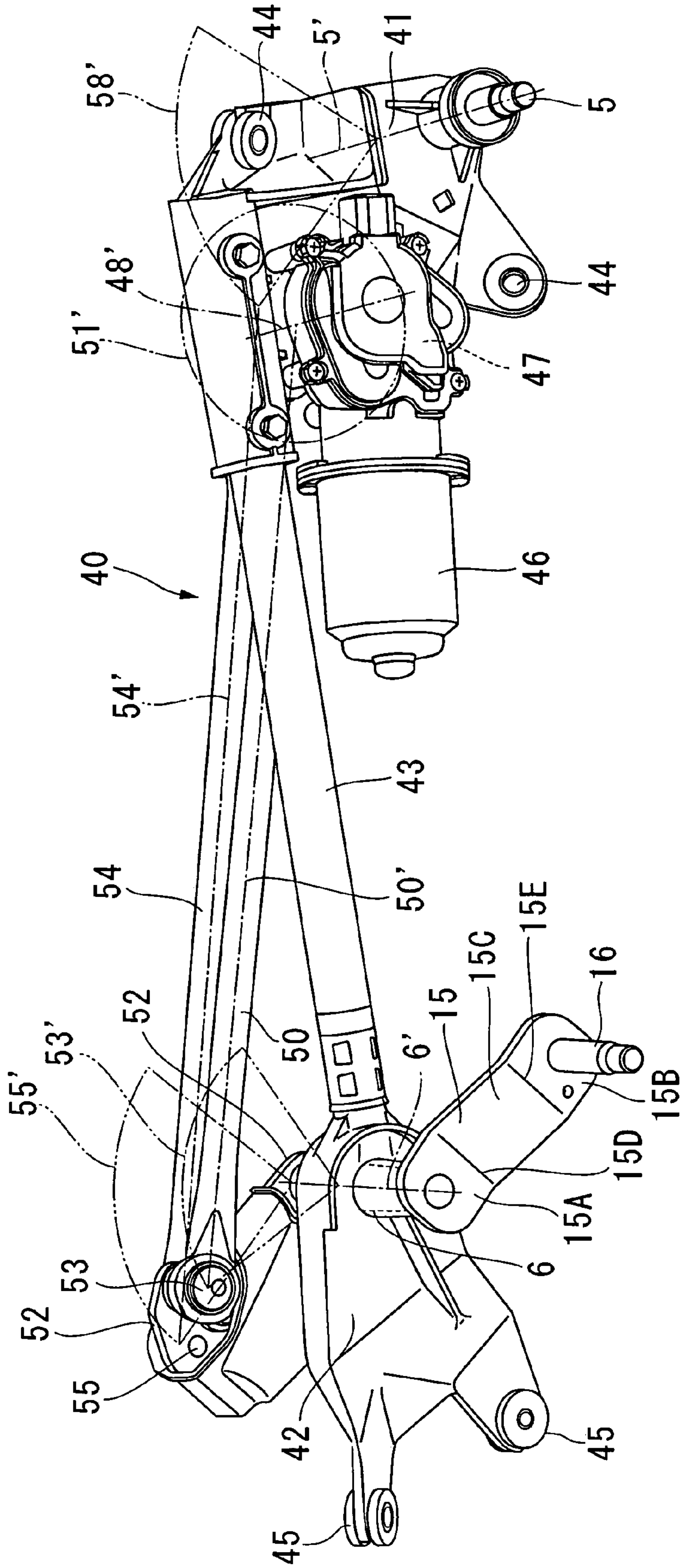
FIG. 8 is a perspective view showing a link device viewed from the top face side.

To simplify understanding of the connections between the various components, FIGS. 7 to 9 illustrate axes of each of the pivot shafts 5 and 6 as axes 5' and 6' respectively, the axis of the A rod 50 as an axis 50', the axis of the B rod 54 as an axis 54', and the axis of the rotation output shaft 48 as an axis 48'. The rotational trajectory of the pin 51 is shown as rotational trajectory 51' and the rotational trajectories of the pins 53, 55, and 58, are shown as rotational trajectories 53', 55', and 58' respectively.

Therefore, when the wiper motor 46 is driven, the rotation output shaft 48 rotates around the axis 48' via the decelerator 47, whereby the pin 51 at the rotating end of the drive link 49 follows the rotational trajectory 51'. This causes the A rod 50 to reciprocate in a direction substantially following the shaft trajectory 50', whereby the B link 52 rotates around the axis 6' of the pivot shaft 6, i.e., the pin 53' rotatably reciprocates along the rotational trajectory 53' at a position removed from the axis 6' of the pivot shaft 6. Therefore, the pivot shaft 6 secured to the base of the B link 52 rotates and the support shaft 16 at the other end of the actuation lever 15 rotates, whereby the second wiper device 4 secured to the support shaft 16 executes a wiping operation.

When the B link 52 rotates, the B rod 54 supported by the pin 55 which rotates reciprocating along the rotational trajectory 55' reciprocates in a direction substantially following the axis 54'. This causes the pin 58 to rotatable reciprocate along the rotational trajectory 58' around the axis 5' of the pivot shaft 5 at the C link 57. Since the pivot shaft 5 secured at the base of the C link 57 also rotates, the wiper device 3 secured to the pivot shaft 5 executes a wiping operation.

While the wiper arm 14 of the wiper device 3 simply rotates reciprocating around the pivot shaft 5, the wiper device 4 changes the reciprocating rotation of the pivot shaft 6 to movement along the circular arc of the support shaft 16 via the actuation lever 15 and thereby secures a large wipe area. Due to this, when the attachment position in the rotation direction of the pivot shaft 6 with respect to the B link 52 and the attachment position in the rotation direction of the actuation lever 15 with respect to the pivot shaft 6 deviate from their set positions, not only does it become impossible to maintain the wipe range as set, but also the arc-shaped arm base 20 interferes with the actuation hole 25 of the vertical wall member 7*c*.

Accordingly, a structure is used that enables the attachment of the pivot shaft 6 with respect to the B link 52 and the attachment of the actuation lever 15 with respect to the pivot shaft 6 to be performed easily, reliably and precisely.

This will be explained more concretely. As shown in FIG. 10, serrated portions 60 and 61 are formed at both ends of the pivot shaft 6. The top end serrated portion 60 is formed by knurling and has fifty-four teeth. The bottom end serrated portion 61 is formed by a male involute serrating process, and has twenty-four teeth, i.e., less than that of the top end serrated portion 60. While the numbers of teeth are not limited to those of this example and may be set freely, the bottom end serrated portion 61 should preferably have fewer teeth than the top end serrated portion 60.

The actuation lever 15 is a thick metal member formed in the shape of a crank, and has a bottom face 15A formed at one end which connects to a top face 15B formed at the other end via a sloping face 15C. Therefore, a first bent portion 15D is formed between the bottom face 15A and the sloping face 15C, and a second bent portion 15E is formed between the sloping face 15C and the top face 15B.

A round hole (lever securing hole portion) 62 is formed at one end of the actuation lever 15. A serration bearing portion (link securing hole portion) 63 is formed at the base end of the B link 52, and its inner periphery has a serration-bearing shape for twenty-four teeth formed by a female involute serrating process.

After the pivot shaft 6 has been press-fitted engaging the bottom end serrated portion 61 with the serration bearing portion 63 of the B link 52, the end of the bottom end serrated portion 61 which protrudes from the face of the B link 52 on the opposite side to the press-fit direction of the pivot shaft 6 is secured by caulking. Moreover, after the position of the pivot shaft 6 is adjusted in the rotational direction with respect to the actuation lever 15, and the top end serrated portion 60 is press-fitted into the round hole 62 in the pivot shaft 6 of the actuation lever 15, the end of the top end serrated portion 60 which protrudes from the face on the opposite side to the press-fit direction of the pivot shaft 6 of the actuation lever 15 is secured by caulking. This secures the actuation lever 15 and the B link 52 to the pivot shaft 6 at adjusted attachment positions. Incidentally, the serrated portions 60 and 61 may be tapered serrations which tail away.

According to this embodiment, in the wiper device 4, the top end serrated portion 60 and the bottom end serrated portion 61 are formed at the top and bottom ends of the pivot shaft 6, and attachment angles around the pivot shaft 6 of the round hole 62 in the actuation lever 15 which is secured to the top end serrated portion 60 and the serration bearing portion 63 of the B link 52 which is secured to the bottom end serrated portion 61 may be set without positional deviation. Therefore, the actuation lever 15 (i.e., the wiper arm 24 of the wiper device 4) may be easily secured at the correct attachment angle and reliably fitted non-rotatable.

Above all, since the serration bearing portion 63 is formed on the B link 52 and the round hole 62 whose position is unrestricted is formed at the actuation lever 15 side, when the bottom end portion 61 of the pivot shaft 6 is engaged with the serration bearing portion 63 of the B link 52, the top end serrated portion 60 may be secured in the round hole 62 of the actuation lever 15 to which the position is adjusted around the pivot shaft 6. The round hole 62 of the actuation lever 15 thus may absorb any attachment error to the pivot shaft 6, and the wiper arm 24 may be secured in position as set.

Since the serration bearing portion 63 is formed on the B link 52, attachment error around the pivot shaft 6 may be absorbed by the round hole 62 of the actuation lever 15. Therefore, even if attachment error accumulates as far as the pivot shaft 6, the accumulated error may be eliminated at the actuation lever 15 which is a member provided near the wiper arm 24. This makes it possible to increase the attachment precision in the rotation direction of the actuation lever 15, i.e., the wiper arm 24.

Also, since the top end serrated portion 60 of the pivot shaft 6 corresponding to the round hole 62 of the actuation lever 15 has more teeth than the bottom end serrated portion 61 of the pivot shaft 6 corresponding to the serration bearing portion 63 of the B link 52, the minimum unit of adjustment angle of the top end serrated portion 60, which is the side where the securing angle is finally adjusted, is small, therefore the adjustment may be made more precisely.

The present invention is not limited to the embodiment described above. For example, the round hole 62 of the actuation lever 15 may be replaced by a serration bearing portion which engages with the top end serrated portion 60 of the pivot shaft 6. Furthermore, the first wiper device 3 and a rear wiper device may have the same configurations as that of the wiper device 4.

While preferred embodiments of the invention as been described and illustrated above, it should be understood that various additions, omissions, substitutions, and other modifications may be made without departing from the scope of the present invention. Accordingly, the present invention is not to be considered as being limited by foregoing description, and is only limited by the scope of the appended claims.

What is claimed is:

1. A wiper device comprising:

a wiper motor;

a link member to which a driving force from the wiper motor is transmitted;

a pivot shaft which has serrated portions formed at both ends thereof, and is secured to the link member at one end thereof;

a lever portion which is secured to the other end of the pivot shaft;

a wiper arm which is connected to an end of the lever portion shifted from an axis of the pivot shaft;

a link securing hole portion which is formed in the link member to which the one serrated portion being secured;

a lever securing hole portion which is formed in the lever portion to which the other serrated portion is secured; and a support shaft which is fixed at one end thereof to the one end of the lever portion so as to be shifted from the axis of the pivot shaft, and is fixed to the wiper arm at another end thereof such that the support shaft forms a connection between the wiper arm and the lever portion, wherein:

only one of the link securing hole portion and the lever securing hole portion has a serration bearing shape formed in a surface thereof, said serration bearing shape matching a shape of the serrated portion of the end of the pivot shaft secured thereto;

numbers of teeth of the respective serrated portions at the ends of the pivot shaft are different from one another; and the serrated portion having a greater number of teeth is secured to the link securing hole portion or the lever securing hole portion not having the matching serration bearing shape formed therein.

2. The wiper device according to claim 1, wherein the serration bearing shape is formed in the link securing hole portion.

3. The wiper device according to claim 1, wherein the serrated portions on the ends of the pivot shaft are shaped to be force-fitted into the link securing hole portion and the lever securing hole portion, respectively, as the sole connections between the pivot shaft and the link securing hole portion and the lever securing hole portion.

4. The wiper device according to claim 1, wherein the other of the link securing hole portion and the lever securing hole portion without the serration bearing portion can be aligned relative to the pivot shaft to eliminate any attachment error of the wiper arm relative to the pivot shaft.

* * * * *